June 13, 1939. E. N. COLE 2,162,159
PROPELLER SHAFT SUPPORT VIBRATION DAMPER
Filed June 14, 1937

Inventor
Edward N. Cole
By Blackmore, Spencer & Hunt
Attorneys

Patented June 13, 1939

2,162,159

UNITED STATES PATENT OFFICE 2,162,159

PROPELLER SHAFT SUPPORT VIBRATION DAMPER

Edward N. Cole, Detroit, Mich., assignor to General Motors Corporation, Detroit, Mich., a corporation of Delaware Application June 14, 1937, Serial No. 148,009

10 Claims. (Cl. 308—26)

My invention relates to motor vehicles and more particularly to an improved intermediate support for a sectional propeller shaft.

An object of the invention is to provide a center bearing which will damp propeller shaft vibration and reduce its transmission to the vehicle chassis.

Figure 1:
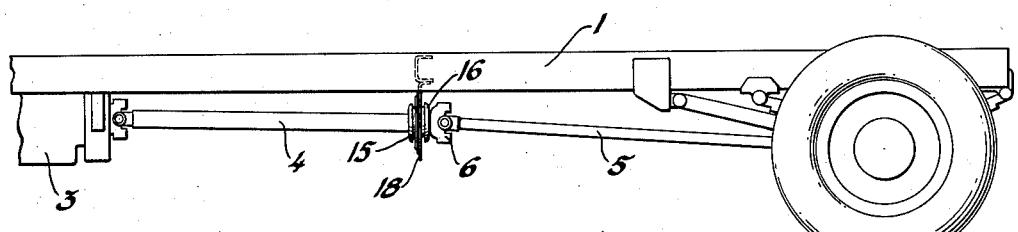
Figure 2:
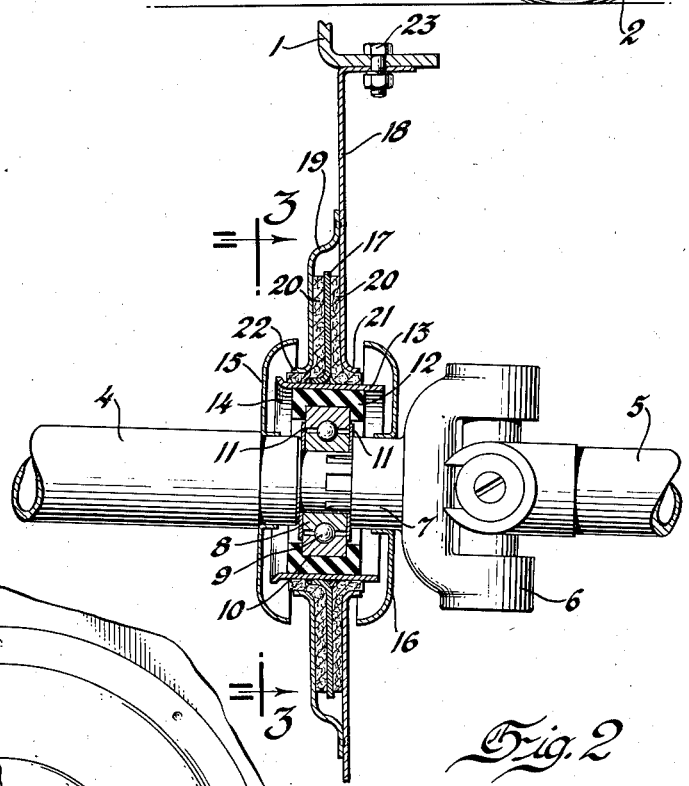
Figure 3:
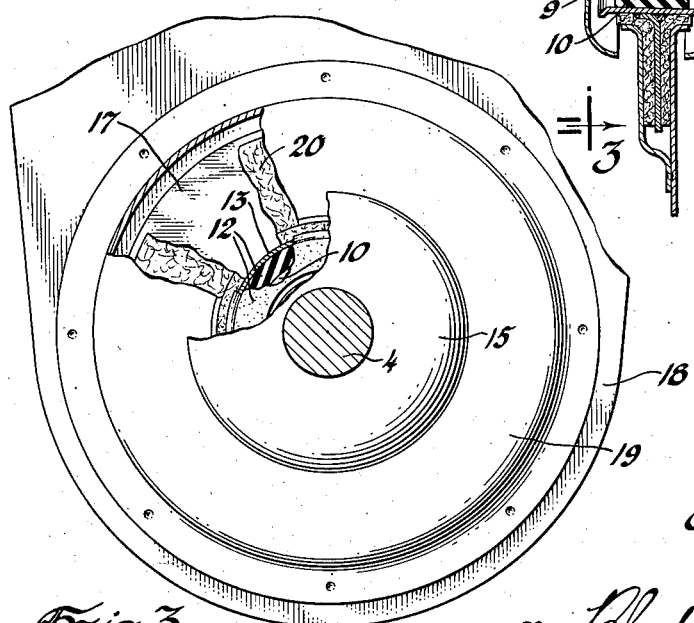

Additional objects and advantages of the construction will be apparent from the following specification having reference to the accompanying drawing wherein Figure 1 is a side elevation of a portion of a vehicle; Figure 2 is an enlarged sectional view of the center support and Figure 3 is a view looking in the direction of the arrows on line 3—3 of Figure 2 with parts broken away.

In the drawing the chassis frame 1 is supported at its rear through suitable springs upon road wheels 2. The wheel driving axle is connected to the power plant 3 by a sectional propeller shaft and the shaft sections 4 and 5 are connected together by a universal joint 6. Between the hub 7 of the forward yoke of the joint 6 and a shoulder on the shaft 4 is clamped the inner race 8 of an anti-friction bearing having hardened balls 9 and an outer race 10. Washers 11—11 are clamped against the opposite sides of the inner race 8 and serve as closures against the entrance of dirt and moisture to the bearing surfaces. In addition these closure washers 11 being rotatable with the propeller shaft act as slingers to throw off any foreign matter that may tend to accumulate thereon.

The outer race 10 is seated within an annular groove in the spacer ring 12 of elastic deformable material such as rubber and embracing the rubber ring is a metal sleeve 13 which holds the rubber under a predetermined stress whereby to maintain the parts in centered relation. For this purpose the outside diameter of the rubber ring 12 when unconfined is slightly greater than the internal diameter of the sleeve 13 and to facilitate its introduction axially into the sleeve one end of the sleeve is bell mouthed or flared outwardly as at 14. This outturned end 14 also helps to exclude foreign matter to the bearing and cooperates with the overlapping dished plate 15 carried by the shaft 4. A similar dished plate 16 is mounted upon and rotates with the hub 7 to throw off dirt and water on the rear side of the mounting.

The lateral extending tubular portion of the metal plate 17 is welded or otherwise secured to the sleeve 13 wherefore the plate 17 constitutes a peripheral flange integral with the sleeve and is housed within an annular pocket formed by a stamped metal frame bracket 18 and a cooperating ring 19 welded thereto. Also contained within the pocket and on opposite sides of the flange 17 are a pair of felt rings 20—20, each of which has its inner edge turned axially into engagement with the periphery of the sleeve 13 and between the sleeve and the outturned flanges 21 and 22 on the members 18 and 19, respectively. The frame bracket 18 is secured by mounting studs 23 to a cross member of the chassis frame 1. This connection preferably is adjustable laterally to enable the center line position of the propeller shaft to be located properly with reference to the power plant 3 and the drive axle for the wheels 2. The size of the pocket formed by the stampings 18 and 19 is such that the peripheral flange 17 is gripped by the two rings of felt 20—20 imposing predetermined stress upon the felt material.

The use of rubber alone for propeller shaft mountings has been found unsatisfactory because the rubber, due to its resiliency, has a natural vibration period of its own which causes objectionable vibration at certain speeds. The substitution of some non-resilient material, such as felt, also is unsatisfactory because material of this sort, if sufficiently compressed to center the bearing, will have insufficient sound absorbing qualities. In the device here involved the rubber acts as a sound absorbing and centering medium yet periodic vibrations in the rubber are damped out by the friction resulting upon sliding motion of the disc 17 against the felt washers 20 or by internal friction of the felt whatever action may occur. The amount of sidewise motion permitted by the felt rings obviously is very small but is sufficient. A larger latitude of motion would permit the propeller shaft to get out of line badly with possible disastrous results.

I claim:

1. In a motor vehicle, an intermediate support for a jointed propeller shaft, including a bearing for rotatably supporting the shaft, elastic deformable material to receive the load on said bearing, confining means for said material, and a frictional damping device operative on said confining means.

2. The combination with a chassis frame and a propeller shaft, of a center bearing for the shaft including an outer member, an inner member in which the shaft is rotatable, elastic deformable material spacing said members and frictional damping means mounting the outer member on the chassis frame.

3. In a motor vehicle having a chassis frame, a propeller shaft center bearing including a bearing sleeve, a rubber spacer ring surrounding said sleeve, an outer sleeve enclosing and holding the spacer ring under radial stress, a peripheral mounting flange on the outer sleeve, a frame bracket having an annular pocket receiving said flange and rings of felt contained within the pocket under stress in engagement with said flange.

4. In a motor vehicle, a shaft bearing ring, a rubber backing for the ring, a sleeve surrounding the rubber backing and having a peripheral flange, a frame bracket having an annular pocket receiving said flange, and felt rings contained within said pocket on opposite sides of said flange.

5. The combination with a supporting bracket and a non-rotatable shaft bearing to be supported, of friction material carried by the bracket, a shiftable plate in frictional engagement with said material and elastic material interposed between said plate and said bearing.

6. The combination with a supporting bracket and a nonrotatable shaft bearing to be supported, of a shiftable member located by said bracket, means frictionally resisting relative movement of the member and bracket, and elastic load transmitting means between said member and the bearing.

7. The combination with a supporting bracket and a non-rotatable shaft bearing to be supported, of means mounting the bearing in the bracket including a floating intermediate member, a rubber ring interposed between said member and the bearing and friction material interposed between said member and the bracket for frictionally resisting member movement.

8. The combination with a supporting bracket and a shaft bearing to be supported, of a rubber ring embracing the bearing, a locating sleeve therefor having an annular flange in spaced cooperative relation with said bracket, and friction lining in said space to frictionally resist displacement of the flange relative to the bracket.

9. The combination with a rotatable shaft, a support and a non-rotatable bearing for the shaft to be supported, of an intermediate member, vibration damping means shiftably mounting said member on the support and cushioning means mounting said bearing on the intermediate member.

10. The combination with a support and a shaft bearing to be supported, of an intermediate bearing encircling member having a radial flange, a support carried bracket encircling said member and having a pocket to receive said flange and terminating in oppositely extended axial projections in radially spaced relation to the member, felt rings within the pocket on both sides of said flange with outturned lateral annular extensions between said projections and the member and a rubber mounting ring located by the member interiorly thereof in embracing relation with the bearing.

EDWARD N. COLE.